United States Patent
Arimitsu et al.

(10) Patent No.: US 6,751,960 B2
(45) Date of Patent: Jun. 22, 2004

(54) CONTROL SYSTEM OF HYBRID TRANSMISSION

(75) Inventors: Minoru Arimitsu, Kanagawa (JP); Keyvan Kargar, Versailles (FR); Yves Pichon, Boulogne-Billancourt (FR)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/375,117

(22) Filed: Feb. 28, 2003

(65) Prior Publication Data

US 2003/0173934 A1 Sep. 18, 2003

(30) Foreign Application Priority Data

Mar. 13, 2002 (JP) ........................................ 2002-068304

(51) Int. Cl.[7] .................. B60K 41/02; F16H 3/72; F16H 37/06; H02H 3/72; B60L 11/00
(52) U.S. Cl. .................. 60/706; 60/711; 60/716; 180/65.2; 180/65.4; 180/65.6; 475/5; 477/76; 477/98
(58) Field of Search .................. 60/706, 711, 716; 477/76, 97, 98; 475/5; 180/65.6, 65.2, 65.3, 65.4

(56) References Cited

U.S. PATENT DOCUMENTS

| | | | |
|---|---|---|---|
| 6,190,283 B1 | 2/2001 | Uchida | |
| 6,429,562 B2 * | 8/2002 | Nakano et al. | 310/113 |
| 6,493,611 B2 * | 12/2002 | Yoshino et al. | 180/65.2 |
| 6,558,283 B1 * | 5/2003 | Schnelle | 180/65.2 |
| 2001/0020805 A1 | 9/2001 | Nakano et al. | |
| 2003/0176955 A1 * | 9/2003 | Minagawa et al. | 180/65.3 |

FOREIGN PATENT DOCUMENTS

JP 2000-236602 A 8/2000

* cited by examiner

*Primary Examiner*—Sheldon J. Richter
(74) *Attorney, Agent, or Firm*—Foley & Lardner

(57) ABSTRACT

A control system for controlling a hybrid transmission including a two-degree-of-freedom differential mechanism is arranged to change a target prime-mover revolution speed of a prime mover so as to decrease an electric power output of first and second motor/generators when a temperature of one of the first and second motor/generators and a power device for the first and second motor/generators is higher than a predetermined temperature, wherein a target driving force of the hybrid vehicle is achieved by a demand prime-mover output generated when an output revolution speed of the hybrid transmission is kept constant and when the target prime-mover revolution speed is determined.

10 Claims, 9 Drawing Sheets

CONTROL SYSTEM OF HYBRID TRANSMISSION

BACKGROUND OF THE INVENTION

The present invention relates to a shift control system of a hybrid transmission which is applicable to a hybrid vehicle equipped with a motor/generator and a prime mover such as an internal combustion engine, and more particularly to a control system of a continuously variable hybrid transmission which is capable of continuously varying a transmission ratio using a differential mechanism disposed between the motor/generator and the prime mover.

U.S. Pat. No. 6,190,283 (≅ JP-A-2000-236602) discloses a hybrid transmission system for a hybrid vehicle equipped with a prime mover, a generator in direct connection with the prime mover and a driving motor receiving electric power from the generator. The generator is controlled in speed by executing a revolution speed control of the prime mover, and the driving motor is controlled in torque so as to generate a target driving force. In this hybrid transmission system, the generator is directly connected to the prime mover, and the driving motor is separated from the generator and the prime mover. Therefore, the operating point of the driving motor does not affect the optimal operating point of the prime mover, and it is easy to set both of the optimal operating points. However, since this hybrid transmission is of a motor direct connection type, a current passing through the direct-connection motor and the inverter becomes large. Therefore, the loss of the direct-connection motor and the inverter becomes large, and the direct-connection motor and the inverter are required to have a large capacity.

SUMMARY OF THE INVENTION

In order to solve this problem, an applicant of the present invention has proposed a hybrid transmission which is constructed by providing a two-degree-of-freedom differential mechanism between a prime mover and a motor although it has not been commonly disclosed yet, and rotating members of the differential mechanism are connected to the prime mover, a driveline and two motor/generators, respectively, so that a continuously variable transmission control is executed by the control of the motor/generators.

However, the inventor of the present invention has found that such a proposed hybrid transmission has been yet required to be further improved in operation. More specifically, this proposed hybrid transmission is designed such that if a target prime-mover revolution speed for achieving a target driving force is derived from a driving condition while maintaining the transmission output revolution speed (vehicle speed), the revolution speeds of two motor/generators are inevitably determined. If the revolution speed of one of motor/generators is high, the cupper loss of the motor/generator also becomes high due to the excessive weakened magnetic field, and therefore the motor/generator and the inverter generate a large quantity of heat due to the cupper loss. Accordingly, even if an operating point of the engine is determined at an operating point as a combination of a revolution speed and an output torque for generating the target driving force without changing the transmission output revolution speed, the inevitably determined operating points of the motor/generators may not be the operating point optimal for the motor/generators, and there is a possibility that the motor/generators and the inverter generates a lot of heat due to the large cupper loss.

In order to eliminate such excessive heat generation, it is necessary to provide a heavy-duty cooling system for the motor/generator and the inverter. However, such a heavy-duty cooling system increases the difficulty in design and in production cost of the system.

It is therefore an object of the present invention to provide an improved control system for a hybrid transmission which monitors a heat generating condition of each of motor/generators and an inverter, and changes the target prime-mover revolution speed when the temperature of the monitored objects is raised, to lower the generated power of the motor/generator and thereby suppressing the heat generation so as to enable the system to operate without a heavy-duty cooling system.

An aspect of the present invention resides in a control system of a hybrid transmission for a hybrid vehicle. The hybrid transmission employs a two-degree-of-freedom differential mechanism comprising at least four rotating members, the differential mechanism determining rotating conditions of all of the rotating members when rotating conditions of two of the rotating members are determined. The rotating members are connected to a prime mover, a driveline and first and second motor/generator, respectively. The control system comprises a controller which is configured to change a target prime-mover revolution speed of the prime mover so as to decrease an electric power output of the first and second motor/generators when a temperature of one of the first and second motor/generators and a power device for the first and second motor/generators is higher than a predetermined temperature, wherein a target driving force of the hybrid vehicle being achieved by a demand prime-mover output generated when an output revolution speed of the hybrid transmission is kept constant and when the target prime-mover revolution speed is determined.

Another aspect of the present invention resides in a hybrid transmission system for a hybrid vehicle equipped with a prime mover and first and second motor/generators. The hybrid transmission system comprising: a two-degree-of-freedom differential mechanism comprising at least four rotating members, rotating conditions of all of the rotating members are determined when rotating conditions of two of the rotating members are determined, the rotating members being connected to the prime mover, a driveline and the first and second motor/generators, respectively; a temperature sensor for detecting temperatures of the first and second motor/generators and a power device for the first and second motor/generators; a prime-mover controller for controlling a prime-mover operating point defined by a revolution speed and an output torque of the prime mover; a motor/generator controller for controlling each motor/generator operating point defined by a revolution speed and an output torque of each of the first and second motor/generators; and a hybrid controller coupled to the temperature sensor, the prime-mover controller and the motor/generator controller, the hybrid controller being configured to change a target prime-mover revolution speed to be sent to the prime-mover controller so as to decrease an electric power generated by the first and second motor/generators when one of the temperatures detected by the temperature sensor is higher than a predetermined temperature, wherein the prime mover generates a demand output for achieving a target driving force when a transmission output revolution speed indicative of a revolution speed of the driveline is kept constant and when the prime motor operates at a prime-mover operating point determined by the target prime-mover revolution speed and an output torque of the prime mover.

A further another aspect of the present invention resides in a method of controlling a hybrid transmission for a hybrid vehicle. The hybrid transmission employs a two-degree-of-freedom differential mechanism comprising at least four rotating members, the differential mechanism determining rotating conditions of all of the rotating members when rotating conditions of two of the rotating members are determined. The rotating members is connected to a prime mover, a driveline and first and second motor/generator, respectively. The method comprising: changing a target prime-mover revolution speed of the prime mover so as to decrease an electric power output of the first and second motor/generators when a temperature of one of the first and second motor/generators and a power device for the first and second motor/generators is higher than a predetermined temperature, a target driving force of the hybrid vehicle being achieved by a demand prime-mover output generated when an output revolution speed of the hybrid transmission is kept constant and when the target prime-mover revolution speed is determined.

The other objects and features of this invention will become understood from the following description with reference to the accompanying drawings.

DETAILED DESCRIPTION OF THE INVENTION

Referring to FIGS. 1 through 8, there is shown an embodiment of a shift control system of a hybrid transmission according to the present invention.

Figure 1:
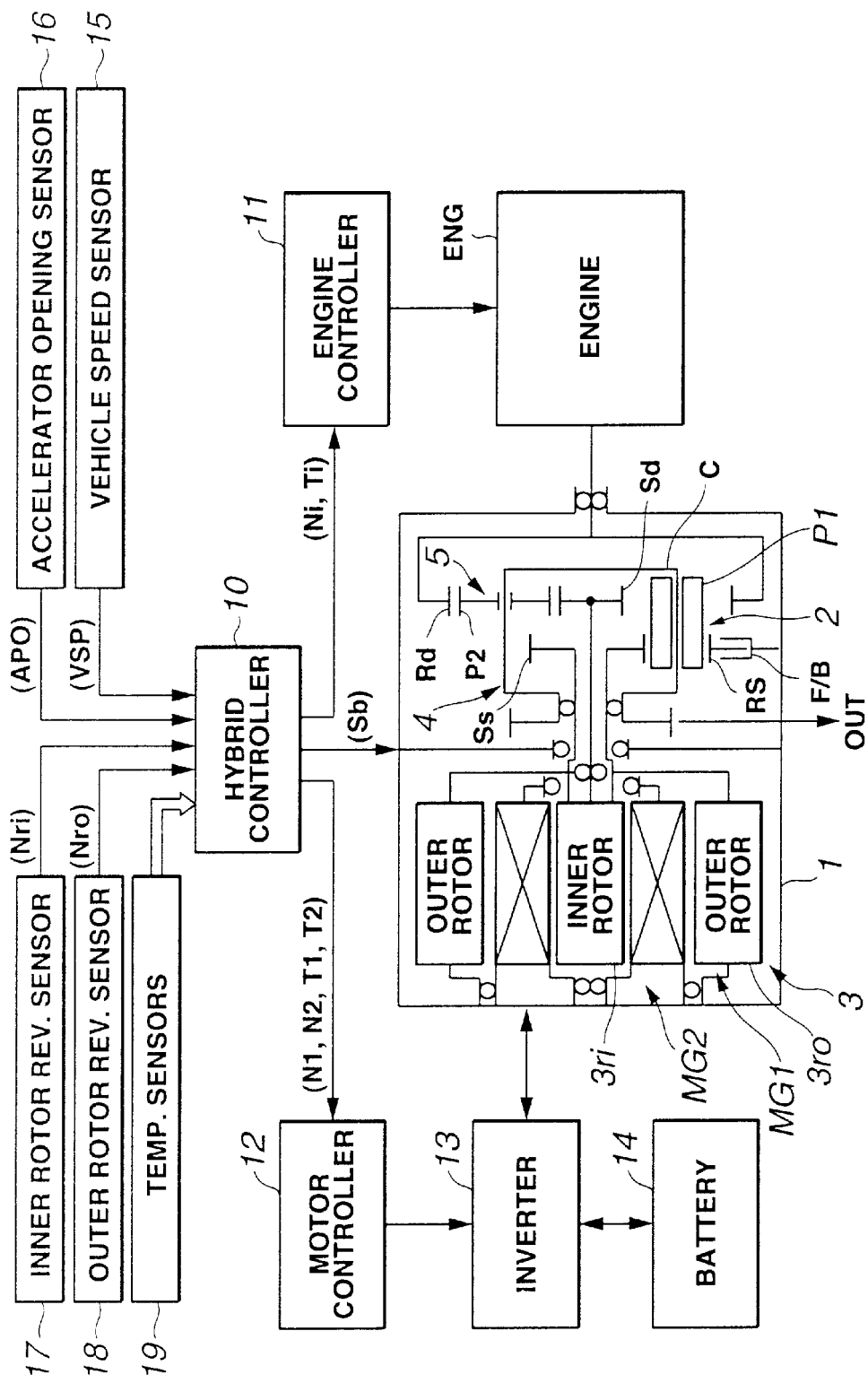
FIG. 1 is a schematic view showing a shift control system of a hybrid transmission of an embodiment according to the present invention.

FIG. 1 shows the hybrid (automatic) transmission provided with the shift control system of the embodiment according to the present invention. In this embodiment the hybrid transmission is adapted to a transaxle of a front-wheel-drive vehicle. As shown in FIG. 1, the hybrid transmission of the embodiment comprises a transmission case 1, a Ravigneaux planetary gearset 2, and a compound-current double-layer motor 3 constructing first and second motor/generators MG1 and MG2. Ravigneaux planetary gearset 2 is built in transmission case 1 so as to be located at a right-hand side of an internal combustion engine ENG (prime mover) along an axial direction of transmission case 1 in FIG. 1. Further, compound-current double-layer motor 3 is built in a transmission case 1 so as to be located at the left-hand side of Ravigneaux planetary gearset 2 along the axial direction of transmission case 1 in FIG. 1.

Ravigneaux planetary gearset 2 and compound-current double-layer motor 3 are coaxially arranged with respect to an axis of transmission case 1. Ravigneaux planetary gearset 2 is of a compound planetary gear train where a single-pinion planetary gearset 4 is combined with a double-pinion planetary gearset 5, and common pinions P1 and a common ring gear Rs are commonly employed in two planetary gearsets 4 and 5.

Single-pinion planetary gearset 4 is located near compound-current double-layer motor 3, and double-pinion planetary gearset 5 is located closer to engine ENG. Single-pinion planetary gearset 4 comprises a sun gear Ss, common ring gear Rs and common pinions P1 in meshed-engagement with both the sun gear Ss and common ring gear Rs.

Double-pinion planetary gearset 5 comprises a sun gear Sd, common pinions P1, common ring gear Rs, a ring gear Rd, and large-diameter pinions P2. Large-diameter pinions P2 are in mesh-engagement with sun gear Sd, ring gear Rd and common pinions P1. Pinions P1 and P2 of the two planetary gearsets 4 and 5 are rotatably mounted or supported on shafts that are a portion of a common pinion carrier C. As discussed above, five rotating members (five elements), that is, sun gear Ss, sun gear Sd, ring gear Rs, ring gear Rd and pinion carrier C correspond to main component parts of Ravigneaux planetary gearset 2. In case of Ravigneaux planetary gearset 2, rotating conditions of all of the rotating members are determined when rotating conditions of two of the rotating members are determined. That is to say, Ravigneaux planetary gearset 2 is a two-degree-of-freedom differential mechanism having a five-element. As clearly shown in FIG. 1, in Ravigneaux planetary gearset 2 incorporated in the hybrid automatic transmission of the embodiment according to the present invention, ring gear Rd of double-pinion planetary gearset 5 is connected to a coaxially-arranged crankshaft of engien ENG so that input torque (engine torque) is transmitted into ring gear Rd. On the other hand, common pinion carrier C is connected to a driveline such as a differential gear device so that output torque of Ravigneaux planetary gearset 2 is extracted from common pinion carrier C.

Compound-current double-layer motor 3 comprises an inter rotor 3ri and an annular outer rotor 3ro surrounding inner rotor 3ri. Inner and outer rotors 3ri and 3ro are coaxially arranged with each other at the rear axial end (the left-hand end) of transmission case 1 and rotatably supported in transmission case 1. A common stator 3s is disposed in an annular space defined between the outer periphery of inner rotor 3ri and the inner periphery of outer rotor 3ro and fixedly connected to transmission case 1. Stator 3s includes an annular stator coil. Annular stator coil 3s and outer rotor 3ro construct an outside motor/generator (first motor/generator) MG1, and annular stator coil 3s and inner rotor 3ri construct an inner motor/generator (second motor/generator) MG2.

In this embodiment, a compound multiphase alternating current (AC), multi-layer (double-layer) motor 3, which has multiple motors (two rotors in this embodiment) and is driven by compound multiphase AC, is employed as first and second motor/generator GM1 and GM2. Further, compound-current double-layer motor 3 is arranged such that the number of pole pairs of inner rotor 3ri is different from the number of pole pairs of outer rotor 3ro. The inner and outer rotors 3ri and 3ro of first and second motor/generators MG1 and MG2 are therefore driven independently of each other by compounding a control current applied to one of the motor/generator set and a control current applied to the other.

When compound multiphase alternating current is supplied to each of first and second motor/generators MG1 and MG2, each of motor/generators MG1 and MG2 functions as an electric motor which outputs a rotational force having a rotational direction corresponding to a current direction and a revolution speed corresponding to a current strength of the supplied current. When no compound multiphase alternating current is supplied to each of first and second motor/generators MG1 and MG2, each of motor/generators MG1 and MG2 functions as a generator which outputs an electric power corresponding to the magnitude of torque applied by way of an external force.

Mechanical connection between compound multiphase AC double-layer motor 3 and Ravigneaux planetary gearset 2 is arranged such that inner rotor 3ri of second motor/generator MG2 is connected to sun gear Sd of double-pinion planetary gearset 5, and outer rotor 3ro of first motor/generator MG1 is connected to sun gear Ss of single-pinion planetary gearset 4. Further, a forward brake F/B is provided so as to be capable of properly braking ring gear Rs of single-pinion planetary gearset 4.

The hybrid transmission of FIG. 1 may not comprise forward brake F/B. If the hybrid transmission without forward brake F/B is working, an alignment chart of the hybrid transmission of FIG. 1 is represented as shown in FIG. 2.

Figure 2:
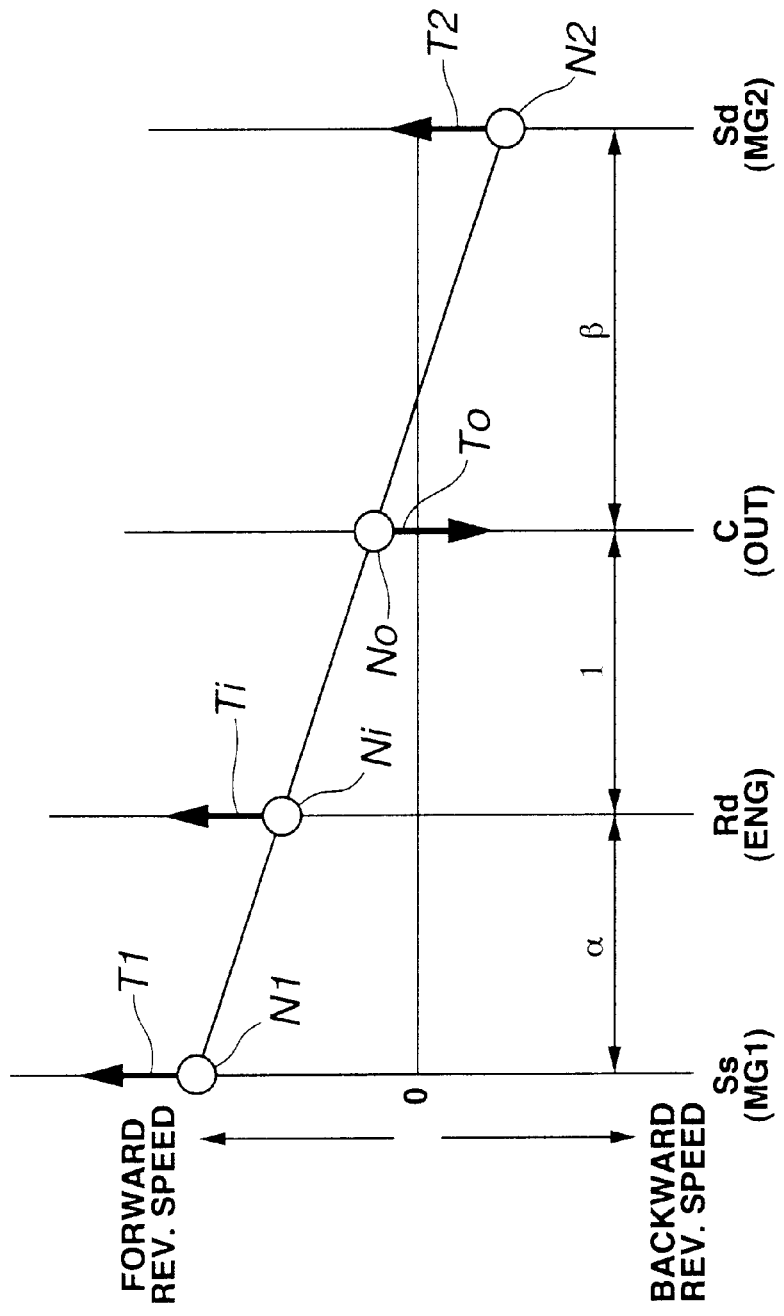
FIG. 2 is an alignment chart of the hybrid transmission without a forward clutch.

In the alignment chart of FIG. 2, $\alpha$ denotes a lever ratio representative of a ratio of a distance between ring gear Rd and sun gear Ss relative to a distance (represented by 1) between ring gear Rd and carrier C, and $\beta$ denotes a lever ratio representative of a ratio of a distance between carrier C and second motor/generator MG2 (corresponding to sun gear Sd) relative to the distance (represented by 1) between ring gear Rd and carrier C.

Since the distance between carrier C and second motor/generator MG2 (sun gear Sd) is determined by the number of teeth of ring gear Rd, lever ratio $\beta$ ($\beta$=Rd/Sd) takes the largest value in case that the transmission is constructed by Ravigneaux planetary gearset 2.

By enabling lever ratio $\beta$ to take a large value, it becomes possible to set the revolution speed of second motor/generator MG2 at a relatively large value. Consequently, on the assumption that an output of the transmission is constant, the design of setting the necessary torque small is achieved by employing Ravigneaux planetary gearset 2.

The condition for determining a gradient (transmission ratio i) of a lever in the alignment chart of FIG. 2 is represented by the following expressions (1) through (4).

$$N1=Ni+\{1-(No/Ni)\}\alpha \cdot Ni \quad (1)$$

$$N2=Ni-\{1-(No/Ni)\}(1+\beta) \cdot Ni \quad (2)$$

$$T1=[Ti/\{(N1/N2)\beta+1+\alpha\}] \quad (3)$$

$$N2=Ti/\{(N2/N1)(1+\alpha)+\beta\} \quad (4)$$

where Ni is an input revolution speed engine revolution speed), Ti is an input torque (engine torque), N1 is a revolution speed of first motor/generator MG1 connected to sun gear Ss, T1 is a torque of first motor/generator MG1, N2 is a revolution speed of second motor/generator MG2 connected to sun gear Sd, and T2 is a torque of second motor/generator MG2. Herein, it is assumed that a gear transmission efficient $\eta m$ is 1 ($\eta_m$=1).

Figure 5:
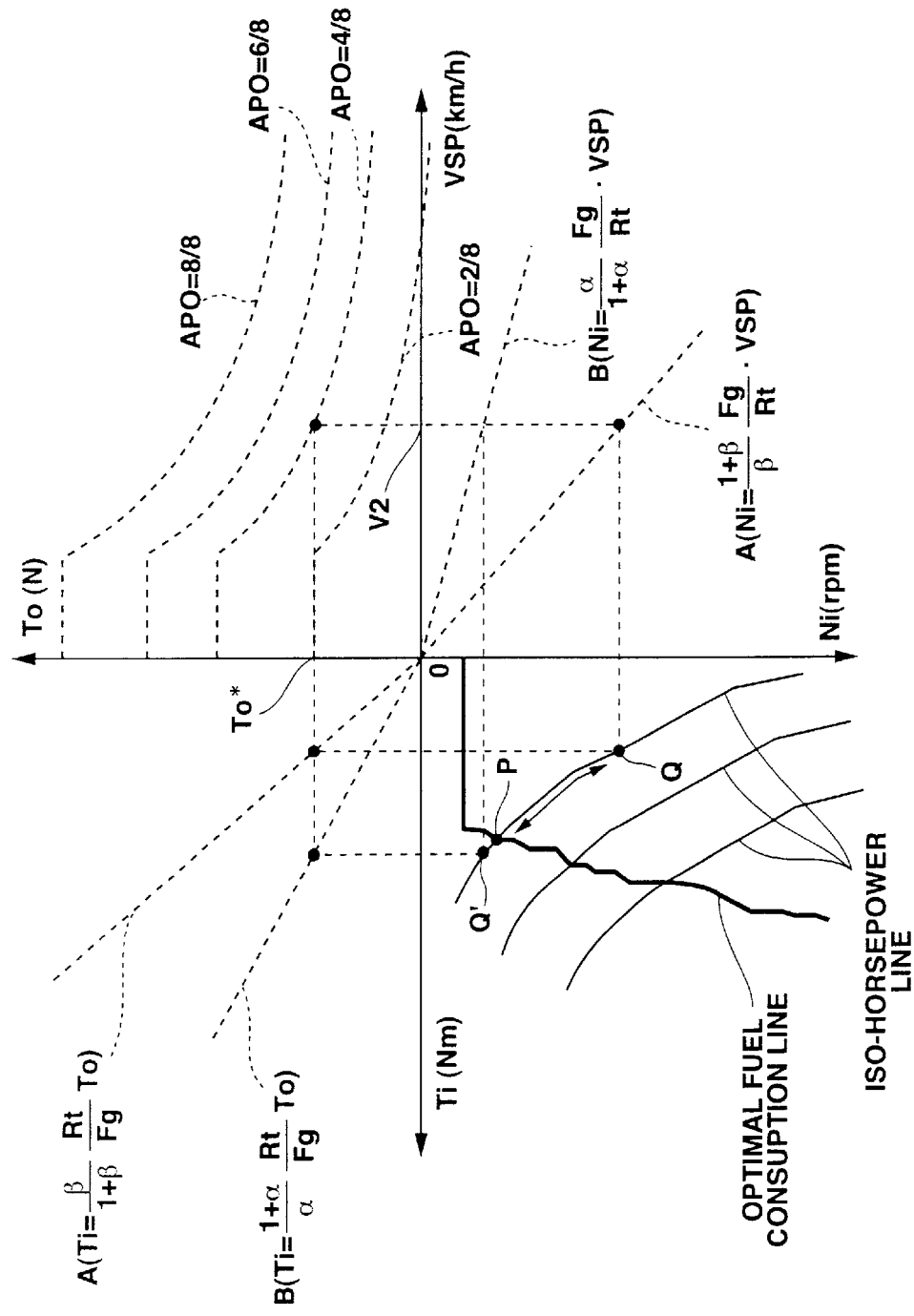
FIG. 5 is a graph showing the operation of the shift control system.
Figure 6:
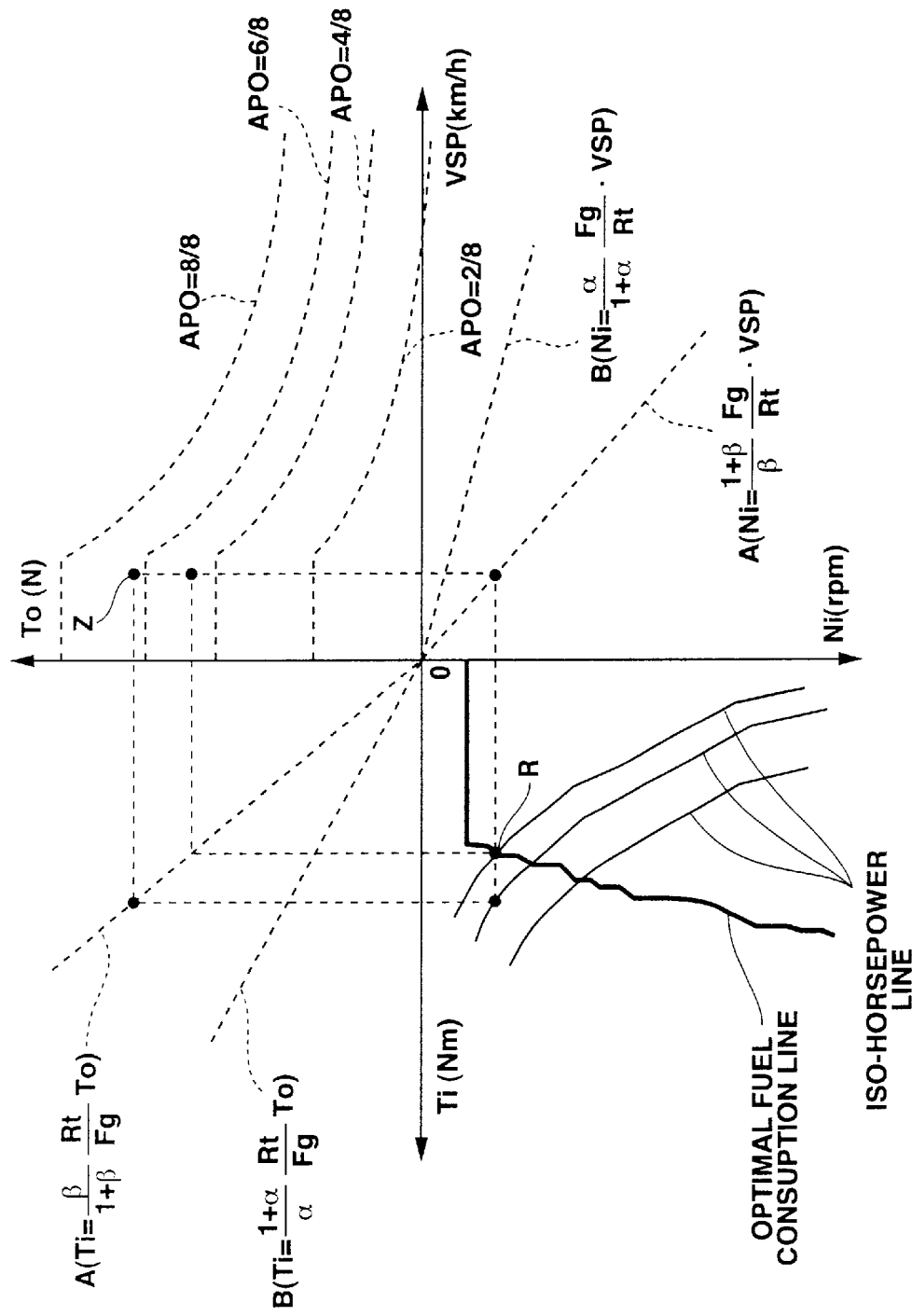
FIG. 6 is a graph showing an operating point optimal for an engine and an operating point optimal for motor/generators on the graph of FIG. 5.

It is important that an engine operating point (Ni,Ti) is set at an engine operating point for achieving the target driving force according to the driving condition with a minimum fuel consumption and without changing transmission output revolution speed No (corresponding to vehicle speed VSP), when the hybrid vehicle operates under a condition that each temperature of first motor/generator MG1, second motor/generator MG2 and a power device of the inverter for controlling them is lower than a high-temperature range wherein some troubles will be caused by the heat generation. This operating point corresponds to an intersection P or R between an optimal fuel consumption line and an iso-horsepower line corresponding to a demand engine output obtained from the target driving force and transmission output revolution speed No (vehicle speed VSP), as shown in FIG. 5 or 6.

By determining the engine operating point (Ni,Ti) which is optimal for engine ENG, revolution speeds N1 and N2 of first and second motor/generators MG1 and MG2 are determined, as is apparent from the alignment chart of FIG. 2. If the revolution speeds N1 and N2 are high, excessively weakened field is produced and therefore cupper loss of motor/generators MG1 and MG 2 becomes large. Consequently, the heat generation of first and second motor/generators MG1 and MG2 and the power device thereof is generated.

If the system continues the optimal fuel consumption control of engine ENG in spite of the heat generation, it is necessary to provide a heavy-duty cooling system for motor/generators MG1 and MG2 and the power device. However, an installation of such a heavy-duty cooling system encounters difficulties in designing the system and increases a production cost of the system.

In order to avoid such problems, the control system of the hybrid transmission of the embodiment according to the present invention is specifically arranged as follow.

As shown in FIG. 1, the control system comprises a hybrid controller 10 performing as an essential part of the shift control system according to the present invention. Hybrid controller 10 sends an engine command as to the engine operating point (Ni,Ti) determined based on the above-discussed concept to engine controller 11. Engine controller 11 controls engine ENG according to the engine command such that engine ENG operates at the command engine operating point (Ni,Ti). Hybrid controller 10 further sends motor commands as to the operating point (N1,T1) of first motor/generator MG1 and the operating point (N2,T2) of second motor/generator MG2 to motor controller 12. Motor controller 12 controls first and second motor/generators MG1 and MG2 through inverter 13 and battery 14 according to the motor commands so that first and second motor/generators MG1 and MG2 operates at the command engine operating points (N1,T1) and (N2,T2), respectively. Further, hybrid controller 10 outputs a brake signal Sb to command forward brake F/B to be engaged, if necessary. This engagement of forward brake F/B enables a power transmission under a transmission-ratio fixed mode.

In order to execute the above-discussed operations, hybrid controller 10 is coupled to a vehicle speed sensor 14, an accelerator opening sensor 16, an inner-rotor revolution speed sensor 17, an outer-rotor revolution speed sensor 18 and temperature sensors 19 to receives signals thereof. Vehicle speed sensor 14 detects a vehicle speed VSP and outputs a signal indicative of vehicle speed VSP. Accelerator opening sensor 16 detects an accelerator opening APO from a depression quantity of an accelerator pedal and outputs a signal indicative of accelerator opening APO. Inner-rotor revolution speed sensor 17 detects a revolution speed Nri of inner rotor 3ri and outputs a signal indicative of revolution speed Nri. Outer-rotor revolution speed sensor 18 detects a revolution speed Nro of outer rotor 3ro and outputs a signal indicative of revolution speed Nro. Temperature sensors 19 comprises sensors for detecting or estimating coil temperatures TMPc1 and TMc2 of first and second motor/generators MG1 and MG2, a junction temperature TMPj, a stator temperature TMPs and a magnet temperature TMPm.

Figure 3:
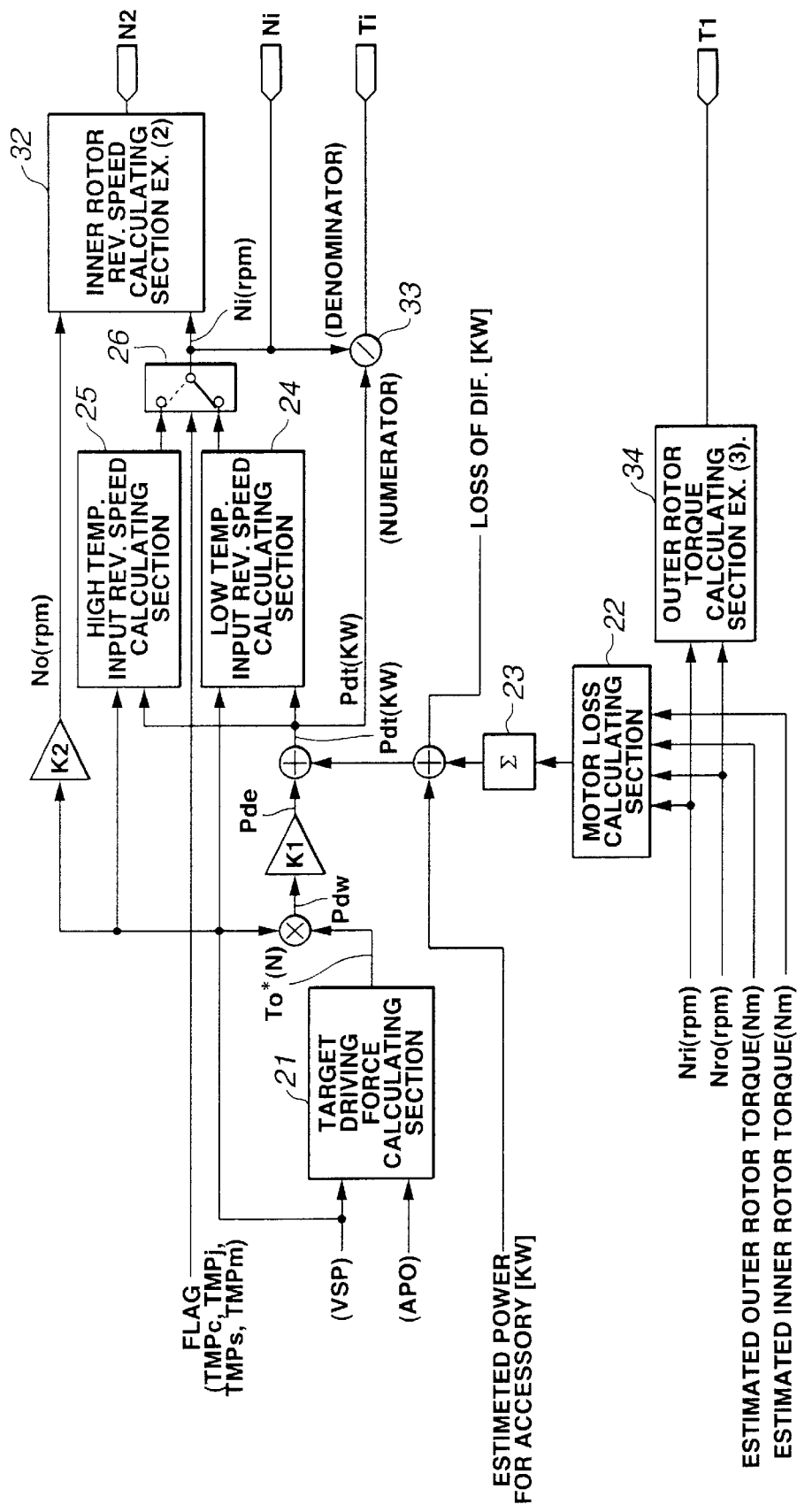
FIG. 3 is a block diagram showing the shift control system of the hybrid transmission.

Hybrid controller 10 determines engine operating point (Ni,Ti) of engine ENG, operating points (N1,T1) and (N2,T2) of first and second motor/generators MG1 and MG2 by executing the processing shown by a block diagram of FIG. 3. Further, hybrid controller 10 outputs signals indicative of these operating points (Ni,Ti), (N1,T1) and (N2,T2) to engine controller 11 and motor controller 12.

A target driving force calculating section 21 shown in FIG. 3 calculates a target driving force $T_0^*$ according to the present operating condition, from accelerator opening APO such as 4/8 opening and vehicle speed VSP such as V2 km/h, on the basis of a target driving force characteristic showing a relationship among vehicle speed VSP, driving force $T_0(N)$ using accelerator opening APO as a parameter, as shown in the first quadrant of FIG. 5. Further, a target output Pdw is obtained by multiplying the obtained target driving force $T_0^*$ and vehicle speed VSP, and a target engine output Pde is calculated by multiplying target Pdw and a constant K1.

Referring to other quadrants in FIG. 5, in the third quadrant of FIG. 5 there is shown a relationship between input revolution speed (engine revolution speed) Ni and input torque Ti (corresponding to engine torque) in the form of iso-horsepower lines. Further, an optimal fuel consumption line of engine ENG alone is shown in the third quadrant. The optimal fuel consumption line is drawn by connecting optimal fuel consumption points at each of which the minimum fuel consumption is realized at each engine output (horsepower).

As to the second quadrant and the fourth quadrant of FIG. 5, an operating line A, on which second motor/generator MG2 works zero and generates zero power by which the loss of second motor/generator MG2 becomes minimum, is drawn in the second and fourth quadrants. Similarly, an operating line B, on which first motor/generator MG1 works zero and generates zero power by which the loss of first motor/generator MG2 becomes minimum, is drawn in the second and fourth quadrants.

The operating line A in each of the second and fourth quadrants of FIG. 5 is derived from the expressions (1) through (4) by inputting a condition that revolution speed N2 of second motor/generator MG2 is zero (N2=0). Similarly, the operating line B in each of the second and fourth quadrants is derived from the expressions (1) through (4) by inputting a condition that revolution speed N1 of first motor/generator MG1 is zero (N1=0). In the expressions in the second and fourth quadrants in FIG. 5, Fg is a final drive gear ratio, and Rt is a radius of a tire.

By setting an engine operating point on one of operating lines A and B in FIG. 5, one of first and second motor/generators MG1 and MG2 is put in no-working state as a motor or generator, and therefore the loss of thereof is set minimum so as to suppress the heat generation.

On the other hand, explaining as to a case that an uppermost side iso-horsepower line in the third quadrant of FIG. 3 corresponds to the engine target output under a condition that the accelerator opening APO is 4/8 opening, and the vehicle speed VSP is V2 km/h, an optimal engine operating point for achieving both of the engine target output and the optimal fuel consumption is a point P which is an intersection between the uppermost iso-horsepower line and the optimal fuel consumption line in the third quadrant in FIG. 5.

However, an operating point, at which the loss (heat generation) of one of first and second motor/generators MG2 and MG1 becomes minimum, that is, an optimum operating point for one of first and second motor/generators MG2 and MG1 can be obtained as a point Q or Q' corresponding to VSP=V2 on the operating line A or B in FIG. 5. The operating point P for operating engine ENG at the minimum fuel consumption is not always optimal for one of first and second motor/generators MG1 and MG2, but the engine operating point Q or Q' is the optimal operating point for first and second motor/generators MG1 and MG2.

Explaining as to an application of the optimal operating line A of second motor/generator MG2, when second motor/generator MG2 generates heat under a condition that engine ENG operates at the engine operating point P by means of the optimal fuel consumption control, the engine operating point is moved from the point P to the point Q on the iso-horsepower line. This movement from the point P to the point Q solves the problem as to the cooling for motor/generators MG1 and MG2 and the power device thereof while achieving the target driving force without varying vehicle speed VSP.

A graph of FIG. 6 is basically similar to that of FIG. 5. In FIG. 6, an optimal engine operating point for both of engine ENG and motor/generators MG1 and MG2 (which is one point) is denoted by R on the optimal operating line A of second motor/generator MG2.

When the driving force $T_0$ is increased from a point corresponding to the point R to a point Z while the vehicle speed VSP is maintained as shown in FIG. 6, an intersection of a horizontal line including the point Z and the optimal operating line A moves toward the higher torque side, that is, toward the lower revolution speed side. This means that the engine operating point optimal for both of engine ENG and motor/generators MG1 and MG2 exists at a lower revolution speed side when the driving force $T_0$ is raised while the vehicle speed VSP is maintained.

On the other hand, when the driving force $T_0$ is decreased from the point corresponding to the point R while the vehicle speed VSP is maintained as shown in FIG. 6, an intersection of a horizontal line including a decreased point and the optimal operating line A moves toward the lower torque side (that is, toward the higher revolution speed side). As a result, the engine operating point optimal for both of engine ENG and motor/generators MG1 and MG2 exists at the higher revolution speed side when the driving force $T_0$ is decreased while the vehicle speed VSP is maintained.

Figure 7:
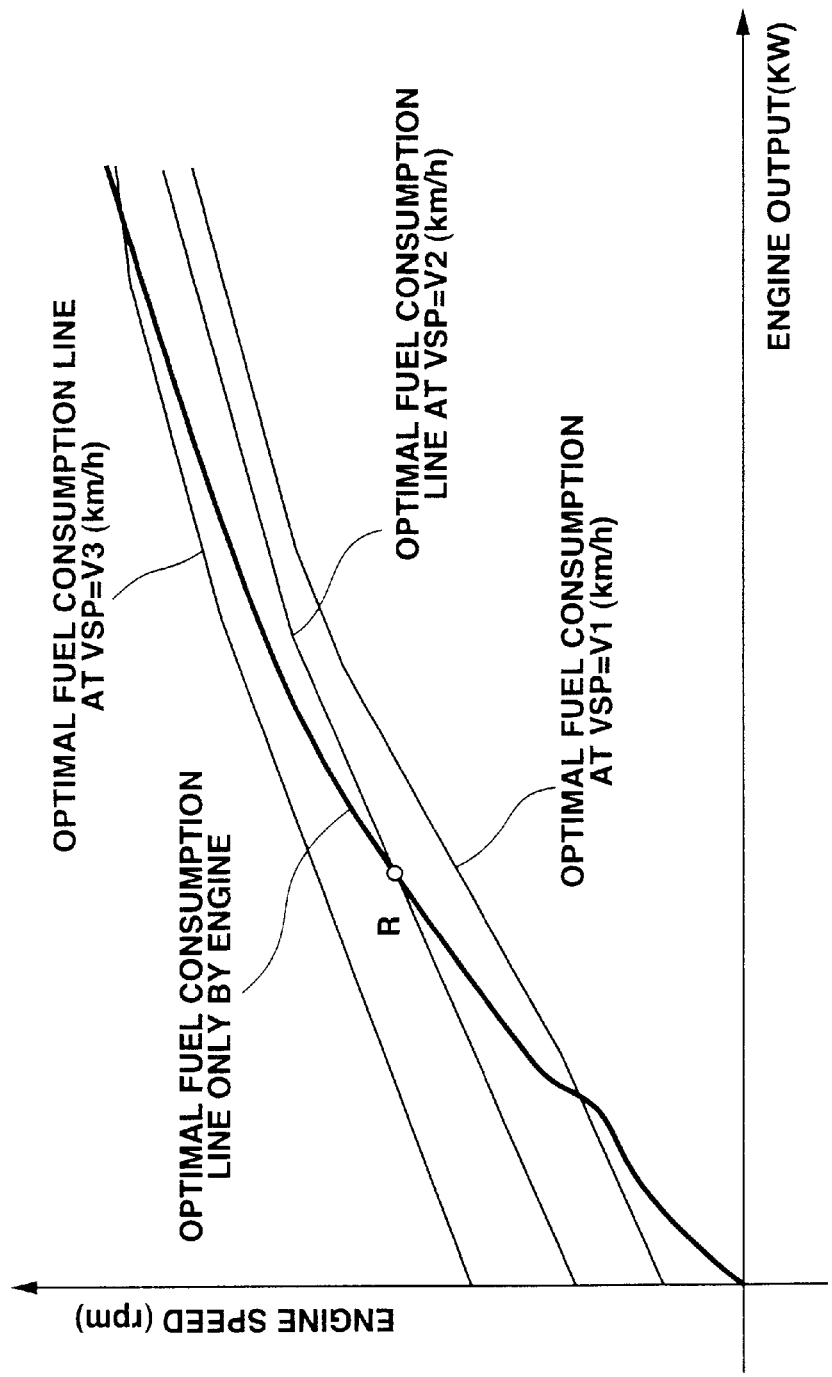
FIG. 7 is a graph showing characteristic curves of an optimal fuel consumption line of an engine alone and optimal fuel consumption lines at vehicle speeds.
Figure 8:
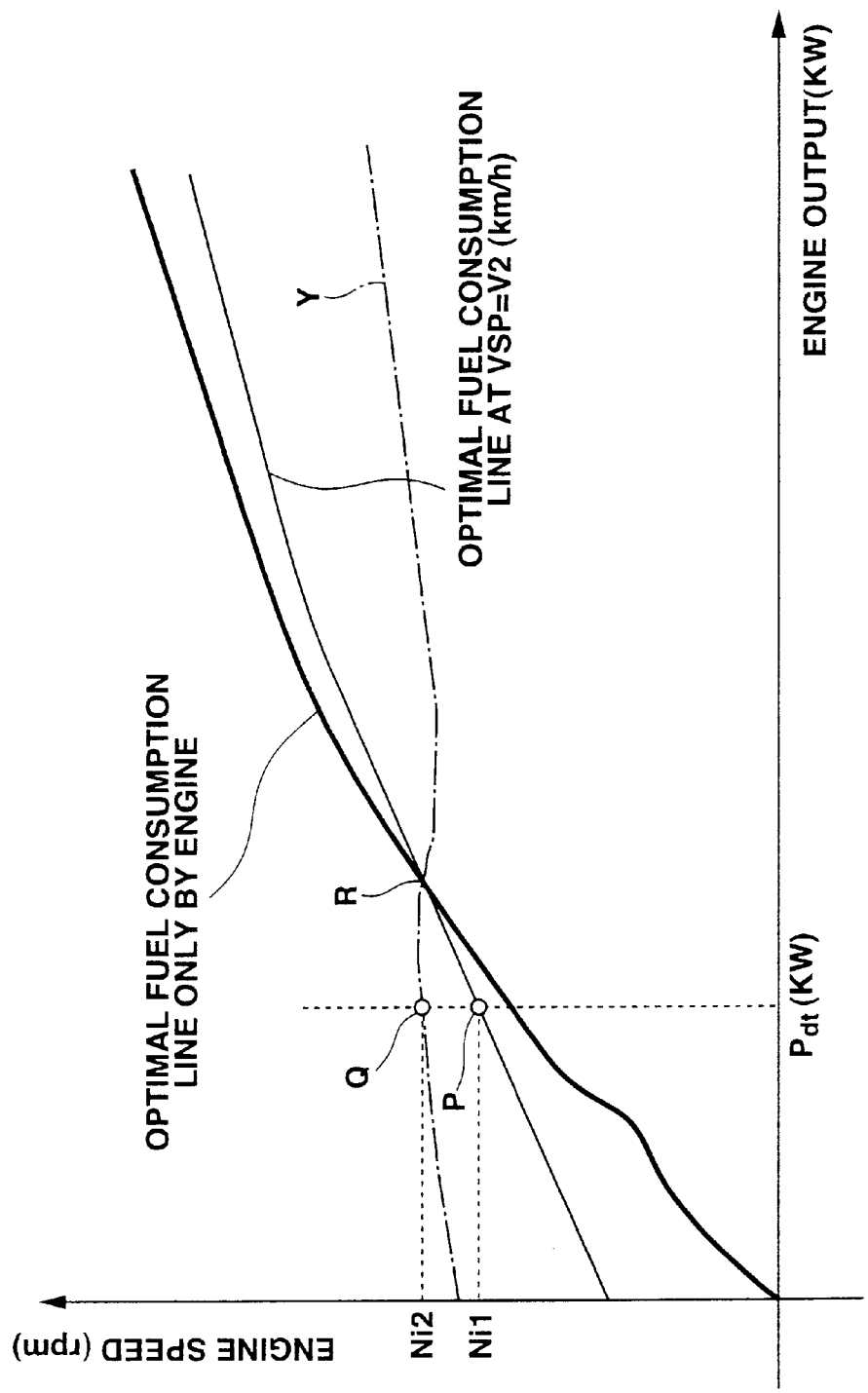
FIG. 8 is a graph showing characteristic curves of an engine operating point optimal for the engine under a predetermined vehicle speed and a locus of an operating point optimal for the motor/generator.

From these results, the engine operating point for minimizing the fuel consumption rate of engine ENG is determined using the engine output and the vehicle speed VSP. FIG. 7 shows a graph, which determines these engine operating points for minimizing the fuel consumption rate.

In FIG. 7, a bold line denotes an optimal fuel consumption line of engine ENG alone, and optimal fuel consumption lines at the respective vehicle speeds (VSP) V1, V2 and V3 are represented by normal lines. The revolution speed as to each optimal fuel consumption line of each vehicle speed (V1, V2, V3) is set to be lower than the revolution speed of engine ENG alone when the revolution speed of each optimal fuel consumption line at each vehicle speed V1, V2, V3 is higher than that at an intersection between the optimal fuel consumption line of engine ENG alone and each optimal fuel consumption line at each vehicle speed V1, V2, V3. Further, the intersections therebetween are located at a higher point in engine output as vehicle speed VSP increases.

Returning to FIG. 3, demand engine output Pdt is obtained by adding the sum of an accessory power estimate, a differential mechanism loss and a motor loss calculated at a motor loss calculating section 22 to target engine output Pde. Motor loss calculating section 22 calculates a loss of first motor/generator MG1 and a loss of second motor/generator MG2 from revolution speed Nri of inner rotor 3ri, revolution speed Nro of outer rotor 3ro, an estimated torque of inner rotor 3ri and an estimated torque of outer rotor 3ro. A block 23 calculates a total motor loss by summing these losses of the respective first and second motor/generators MG1 and MG2.

Demand engine output Pdt is inputted to a low-temperature input revolution speed calculating section 24 and a high-temperature input revolution speed calculating section 25. Further, vehicle speed VSP is also inputted to these sections 24 and 25. Low-temperature input revolution speed calculating section 24 calculates a target low-temperature input revolution speed (target low-temperature engine revolution speed) Ni1 for achieving demand engine output Pdt without changing vehicle speed VSP while keeping the minimum fuel consumption, from demand engine output Pdt and vehicle speed VSP and based on the map shown in FIG. 7.

By this calculation, target low-temperature input revolution speed Ni1 corresponds to the engine operating point optimal for engine ENG denoted by the point P in FIG. 5. Exemplified in the case of VSP=V2, target low-temperature input engine revolution speed Ni1 is obtained as the point P shown in FIG. 8 in correspond to demand engine output Pdt.

High-temperature input revolution speed calculating section 25 calculates a target high-temperature input revolution speed (target high-temperature engine revolution speed) Ni2 for achieving demand engine output Pdt from demand engine output Pdt and vehicle speed VSP so that the loss of first and second motor/generators MG1 and MG2 becomes zero without changing vehicle speed VSP.

By this calculation, target high-temperature input revolution speed Ni2 corresponds to the engine operating point optimal for motor/generators MG1 and MG2 denoted by the point Q in FIG. 5. Exemplified in the case of VSP=V2, target high-temperature input engine revolution speed Ni2 is obtained as the point Q shown in FIG. 8 in correspond to demand engine output Pdt.

A target input revolution speed selecting section 26 selects one of target low-temperature input revolution speed Ni1 and target high-temperature input revolution speed Ni1 according to a temperature determination flag FLAG which is set on the basis of coil temperature TMPc of first and second motor/generators MG1 and MG2, junction temperature TMPj, stator temperature TMPs, magnet temperature TMPm, which are detected or estimated by temperature sensors 19 shown in FIG. 1.

Figure 4:
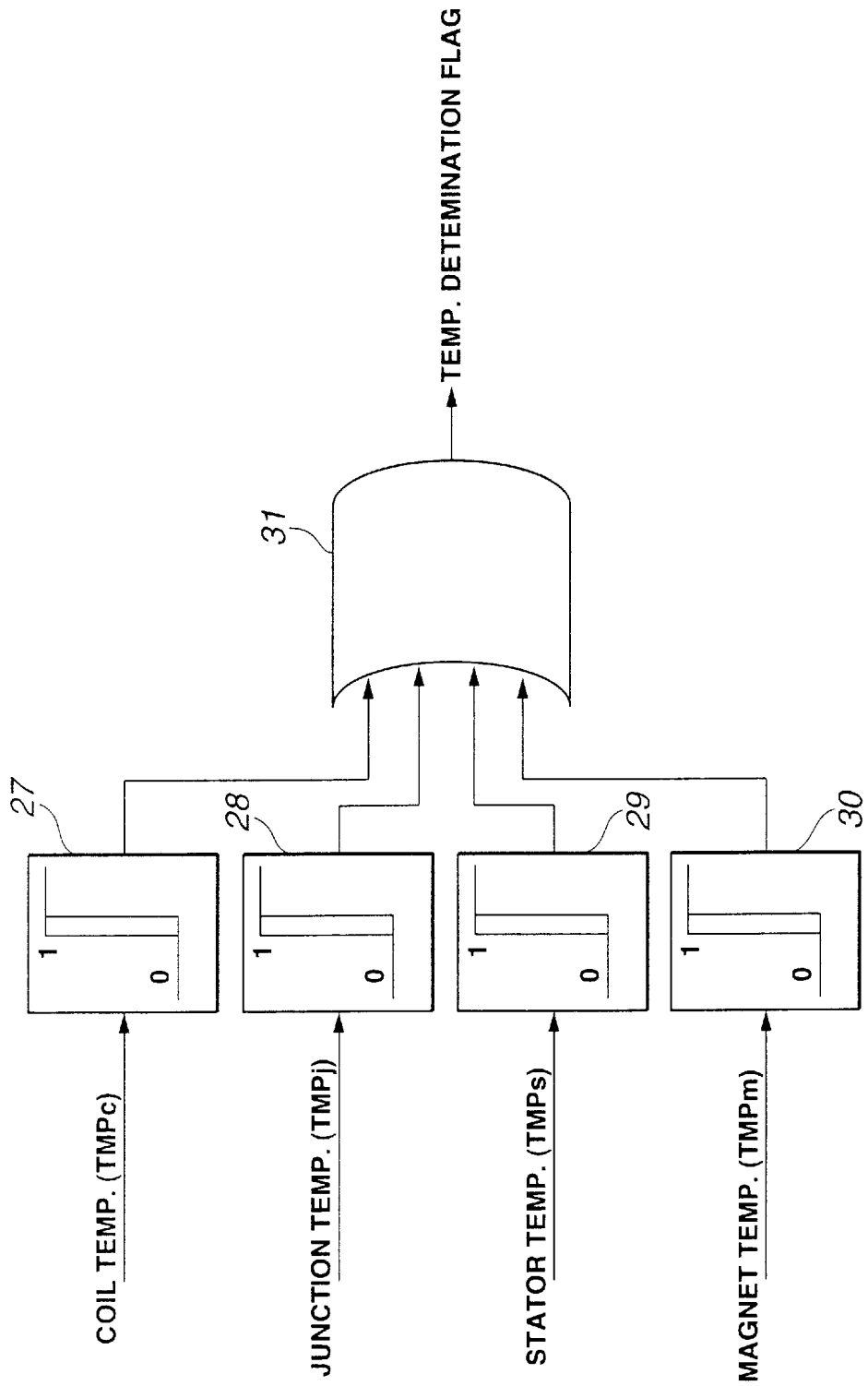
FIG. 4 is a diagram showing a temperature determining section in the shift control system.

An OR gate 31 sets temperature determination flag FLAG at 1 (FLAG=1) when temperature determining sections 27 through 40 shown in FIG. 4 determines that at least one of coil temperature TMPc, junction temperature TMPj, stator temperature TMPs and magnet temperature TMPm is higher than or equal to each preset temperature. When all of these temperatures TMPc, TMPj, TMPs and TMPm are lower than the respective set temperature, temperature determination flag FLAG is set at 0 (FLAG=0).

When FLAG=0, target input revolution speed selecting section 36 selects target low-temperature input revolution speed Ni1 and outputs this revolution speed Ni1 as command input engine revolution speed Ni to engine controller 11. When FLAG=1, target input engine revolution speed selecting section 36 selects target high-temperature input engine revolution speed Ni2 and outputs this revolution speed Ni2 as command input engine revolution speed Ni to engine controller 11.

When target input engine revolution speed selecting section 26 changes the selection between target high and low temperature input engine revolution speeds Ni1 and Ni2, command input engine revolution speed Ni is gradually changed between the two values Ni1 and Ni2 with a time gradient (a gradient with respect to time. This gradual change is executed in both of a way from a low side to a high side and a way from the high side to the low side.

Although command input revolution speed Ni is determined by the above discussed operations, inner-rotor revolution speed calculating section 32 calculates an inner-rotor revolution speed N2 using the expression (2) and from command input revolution speed Ni and transmission output revolution speed No obtained by multiplying vehicle speed VSP and a constant K3 determined by final gear ratio Fg and tire radius Rt, and outputs the calculated inner-rotor revolution speed N2 to motor controller 12.

Command engine torque calculating section 33 calculates a command engine torque Ti by dividing demand engine output Pdt with input engine revolution speed Ni, and outputs the calculated command value Ti to engine controller 11. Outer-rotor torque calculating section 34 calculates target outer rotor torque Ti for outer rotor 3ro of first motor/generator MG1, and outputs the calculated target torque Ti to motor controller 12.

With the thus arranged control, target input revolution speed selecting section 26 selects target low-temperature input revolution speed Ni1 and treats the revolution speed Ni1 as command input revolution speed Ni as far as all of the temperatures of first and second motor/generators MG1 and MG2, and the power device thereof are lower than the respective preset values. Therefore, as shown by the point P in FIGS. 5 and 8, the system executes the optimal fuel consumption control for achieving the demand engine output Pdt corresponding to the target driving force while keeping the minimum fuel consumption.

Further, when one of the temperatures of first and second motor/generators MG1 and MG2 and the power device thereof becomes higher than the respective preset value, that is, when FLAG=1, target input-revolution speed selecting section 26 selects target high-temperature input revolution speed Ni2 and treats the revolution speed Ni2 as command input engine revolution speed Ni. Therefore, as shown by the point Q in FIGS. 5 and 8, the system executes the control for controlling demand engine output Pdt corresponding to the target driving force so that the generated power of motor/generators MG1 and MG2 is zero. This control suppresses the heat generation of motor/generators MG1 and MG2 and the power device thereof and avoids the temperature thereof from raising up. A characteristic line Y shown in FIG. 8 exemplifies a change of locus of command input engine revolution speed Ni according to the temperature change under a condition of VSP=V2.

With the thus arrangement of the embodiment according to the present invention, when the temperature of each of first and second motor/generator MG1 and MG2 and the power device thereof becomes higher than the preset value, command input revolution speed Ni is changed into a direction for lowering the generated electric power of motor/generators MG1 and MG2 so as to suppress the heat generation of the first and second motor/generators MG1 and MG2 and the power device. Therefore, the system according to the present invention may not equip with a heavy-duty cooling system for the motor/generators and the power device and thereby solving the difficulty in design and the disadvantage in cost.

Further, with the embodiment according to the present invention, when command input revolution speed Ni is changed in response to the increase of the temperatures as discussed above, the engine operating point is moved from the engine operating point P optimal for engine to the engine operating point Q optimal for motor/generators MG1 and MG2. The engine operating point P is determined by target low-temperature input revolution speed Ni1 and the output torque Ti which generate demand engine output Pdt corresponding to the target driving force while achieving the minimum fuel consumption. The engine operating point Q is determined by target high-temperature input revolution speed Ni2 and the output torque Ti which achieves demand engine output Pdt corresponding to the target driving force while controlling the generated power of motor/generators MG1 and MG2 at zero.

Therefore, the control system according to the present invention achieves the advantages while minimizing the separation from the engine operating point Q optimal for engine ENG, suppressing a penalty in fuel consumption and suppressing the heat generation of the motor/generators and the power device.

Further, the control system according to the present invention is arranged such that the demand engine output corresponding to the target driving force is obtained by further adding the loss of the motor/generators MG1 and MG2 and the power device 13 obtained at the calculating section 22 and the loss of the differential mechanism. This arrangement enables these losses to be compensated by the driving force of engine ENG, and the battery capacity for the motor/generator to be decreased. Therefore, it becomes possible to decrease the cost of the battery and to suppress the loss of the battery.

Furthermore, it is preferable that low-temperature input revolution speed calculating section 24 and high-temperature input revolution speed calculating section 25 previously store a low-temperature map for determining target low-temperature input revolution speed Ni1 and a high-temperature map for determining target high-temperature input revolution speed Ni2, and calculates one of target low-temperature input revolution speed Ni1 and target high-temperature input revolution speed Ni2 by selecting one of the low-temperature map and the high-temperature map according to the temperature determination flag FLAG and by retrieving the selected map. If this arrangement is employed, the determination and the calculation of the one of target low-temperature input revolution speed Ni1 and target high-temperature input revolution speed Ni2 are executed without employing the complicated calculations. Therefore, it becomes possible to further quickly execute the determination and the calculation in high-speed.

Further, if the high-temperature map comprises a plurality of maps by each temperature, it becomes possible to obtain the target input engine revolution speed, which smoothly changes according to the increase of the temperature. This arrangement prevents the vehicle occupant from having a strange feeling as to the change of the input engine revolution speed.

Figure 9:
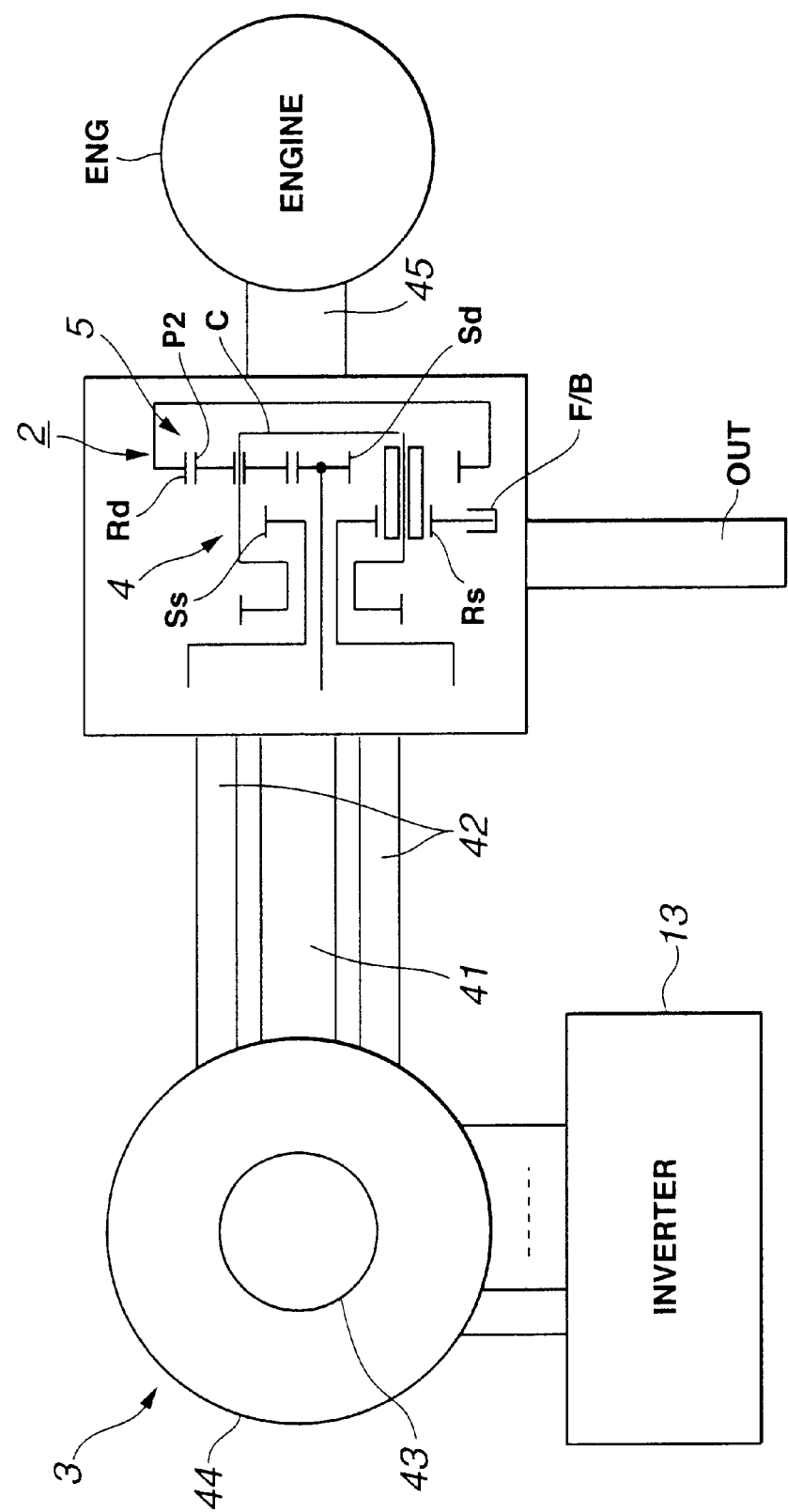
FIG. 9 is a schematic view showing a modification of the shift control system of the hybrid transmission according to the present invention.

A motor shown in FIG. 9 is of a compound motor which divides intermediate points of a stator coil into the plural groups and receives a compound current. A detailed explanation of this compound motor is disclosed in U.S. patent application Publication No. US2001/0020805A1, the disclosure of which is hereby incorporated by reference.

In FIG. 9, motors 43 and 44 are respectively connected to rotation shafts 41 and 43 of a differential mechanism constructed by Ravigneaux planetary gearset 2, a rotation shaft 45 of the differential mechanism is connected to engine ENG, and carrier C is connected to output OUT.

Each of motor 43 and motor 44 is a three-phase three pole-pair permanent-magnet motor, and receives compound current from inverter 13 through the plural groups of intermediate points. The advantages gained by the embodiment according to the present invention are also achieved by constructing motor 3 by this compound motor.

This application is based on Japanese Patent Application No. 2002-68304 filed on Mar. 13, 2002 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A control system of a hybrid transmission for a hybrid vehicle, the hybrid transmission employing a two-degree-of-freedom differential mechanism comprising at least four rotating members, the differential mechanism determining rotating conditions of all of the rotating members when rotating conditions of two of the rotating members are determined, the rotating members being connected to a prime mover, a driveline and first and second motor/generator, respectively, the control system comprising:

a controller configured to change a target prime-mover revolution speed of the prime mover so as to decrease an electric power output of the first and second motor/generators when a temperature of one of the first and second motor/generators and a power device for the first and second motor/generators is higher than a predetermined temperature, a target driving force of the hybrid vehicle being achieved by a demand prime-mover output generated when an output revolution speed of the hybrid transmission is kept constant and when the target prime-mover revolution speed is determined.

2. The control system as claimed in claim 1, wherein the demand output of the prime mover is corrected by adding an output corresponding to the sum of a loss of the first and second motor/generators, a loss of the power device of the motor/generators and a loss of the differential mechanism.

3. The control system as claimed in claim 1, wherein the controller comprises a high-temperature revolution speed map indicative of a relationship between the demand output of the prime mover and the target prime-mover revolution speed and a low-temperature revolution speed map indicative of a relationship between the demand output and the target prime-mover revolution speed, the controller being configured to select the high-temperature revolution speed map when the temperature of one of the first and second motor/generators and the power device for the first and second motor/generators is higher than the predetermined temperature, to select the low-temperature revolution speed map when the temperature of one of the first and second motor/generators and the power device for the first and second motor/generators is lower than or equal to the predetermined temperature, and to retrieve the target prime-mover revolution speed from the selected map, based on the demand output of the prime mover and an output revolution speed of the hybrid transmission.

4. The control system as claimed in claim 1, further comprising a temperature sensor for detecting temperatures of the first and second motor/generators and a power device for the first and second motor/generators, wherein the controller comprises a revolution-speed map indicative of a relationship among the temperature, the demand output of the prime mover and the target prime-mover revolution speed, the controller being configured to determine the target prime-mover revolution speed using the revolution-speed map from the detecting temperature and the demand output.

5. The control system as claimed in claim 1, wherein an operating point defined by a revolution speed and an output torque of the prime mover is changed from a prime-mover optimal operating point at which the prime mover generates the demand output while maintaining a minimum fuel consumption to a motor/generator optimal operating point at which at least one of the first and second motor/generator generates zero electric power, when the temperature of one of the first and second motor/generators and the power device for the first and second motor/generators is higher than the predetermined temperature.

6. The control system as claimed in claim 5, wherein when the operating point is changed between the prime-mover optimal operating point and the motor/generator optimal operating point, the target prime-mover revolution speed is gradually varied with a predetermined gradient with respect to time.

7. The control system as claimed in claim 5, wherein one of the rotating members of the differential mechanism is capable of being fixed by a forward brake.

8. A hybrid transmission system for a hybrid vehicle equipped with a prime mover and first and second motor/generators, the hybrid transmission system comprising:
   a two-degree-of-freedom differential mechanism comprising at least four rotating members, rotating conditions of all of the rotating members are determined when rotating conditions of two of the rotating members are determined, the rotating members being connected to the prime mover, a driveline and the first and second motor/generators, respectively;
   a temperature sensor for detecting temperatures of the first and second motor/generators and a power device for the first and second motor/generators;
   a prime-mover controller for controlling a prime-mover operating point defined by a revolution speed and an output torque of the prime mover;
   a motor/generator controller for controlling each motor/generator operating point defined by a revolution speed and an output torque of each of the first and second motor/generators; and
   a hybrid controller coupled to the temperature sensor, the prime-mover controller and the motor/generator controller, the hybrid controller being configured,
      to change a target prime-mover revolution speed to be sent to the prime-mover controller so as to decrease an electric power generated by the first and second motor/generators when one of the temperatures detected by the temperature sensor is higher than a predetermined temperature, wherein the prime mover generates a demand output for achieving a target driving force when a transmission output revolution speed indicative of a revolution speed of the driveline is kept constant and when the prime motor operates at a prime-mover operating point determined by the target prime-mover revolution speed and an output torque of the prime mover.

9. A method of controlling a hybrid transmission for a hybrid vehicle, the hybrid transmission employing a two-degree-of-freedom differential mechanism comprising at least four rotating members, the differential mechanism determining rotating conditions of all of the rotating members when rotating conditions of two of the rotating members are determined, the rotating members being connected to a prime mover, a driveline and first and second motor/generator, respectively, the method comprising:
   changing a target prime-mover revolution speed of the prime mover so as to decrease an electric power output of the first and second motor/generators when a temperature of one of the first and second motor/generators and a power device for the first and second motor/generators is higher than a predetermined temperature, a target driving force of the hybrid vehicle being achieved by a demand prime-mover output generated when an output revolution speed of the hybrid transmission is kept constant and when the target prime-mover revolution speed is determined.

10. A control system of a hybrid transmission for a hybrid vehicle, the hybrid transmission employing a two-degree-of-freedom differential mechanism comprising at least four rotating members, the differential mechanism determining rotating conditions of all of the rotating members when rotating conditions of two of the rotating members are determined, the rotating members being connected to a prime mover, a driveline and first and second motor/generator, respectively, the control system comprising:
   changing means for changing a target prime-mover revolution speed of the prime mover so as to decrease an electric power output of the motor/generator when a temperature of one of the first and second motor/generators and a power device for the first and second motor/generators is higher than a predetermined temperature, wherein a target driving force of the hybrid vehicle is achieved by a demand prime-mover output generated when an output revolution speed of the hybrid transmission is kept constant and when the target prime-mover revolution speed is determined.

* * * * *

UNITED STATES PATENT AND TRADEMARK OFFICE
CERTIFICATE OF CORRECTION

PATENT NO. : 6,751,960 B2
DATED : June 22, 2004
INVENTOR(S) : Minoru Arimitsu, Keyvan Kargar and Yves Pichon It is certified that error appears in the above-identified patent and that said Letters Patent is hereby corrected as shown below:

<u>Title page,</u>
Item [73], Assignee, should read as follows:
-- RENAULT s.a.s. société par actions simplifiée --

Signed and Sealed this

Twenty-third Day of November, 2004

JON W. DUDAS
*Director of the United States Patent and Trademark Office*